(12) United States Patent
Perumalla et al.

(10) Patent No.: US 12,094,064 B2
(45) Date of Patent: Sep. 17, 2024

(54) SELECTIVE COMPRESSION OF VOLUMETRIC VIDEO IN A VIRTUAL REALITY ENVIRONMENT PRELIMINARY CLASS

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Archana Ponnada, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 18/056,922

(22) Filed: Nov. 18, 2022

(65) Prior Publication Data
US 2024/0169675 A1    May 23, 2024

(51) Int. Cl.
  *G06T 19/00*    (2011.01)
  *H04N 19/597*    (2014.01)
(52) U.S. Cl.
  CPC ......... *G06T 19/003* (2013.01); *H04N 19/597* (2014.11)
(58) Field of Classification Search
  CPC .......................... G06T 19/003; H04N 19/597
  See application file for complete search history.

(56) References Cited

U.S. PATENT DOCUMENTS

| | | | |
|---|---|---|---|
| 9,536,324 B1 | 1/2017 | Fram | |
| 10,469,820 B2 | 11/2019 | Jiang | |
| 11,025,882 B2 | 6/2021 | Juang | |
| 2021/0192796 A1* | 6/2021 | Aflaki Beni | G06T 9/40 |
| 2022/0377349 A1* | 11/2022 | Otsuka | H04N 19/146 |
| 2022/0405976 A1* | 12/2022 | Yu | H04N 19/132 |

FOREIGN PATENT DOCUMENTS

| | | |
|---|---|---|
| WO | 2021063887 A1 | 4/2021 |
| WO | 2021260266 A1 | 12/2021 |

OTHER PUBLICATIONS

C.I. Bajaj, "Feature Based Volumetric Video Compression for Interactive Playback", ResearchGate, Nov. 2002, 9 pp.
"V-Nova and PresenZ Take Volumetric to the Metaverse", Digital Media World, Jan. 2, 2022, 10 pp.
"Canon and IBM Form Joint Business Operation Utlilizing Volumetric Video Technology to Promote the Visual and Performing Arts", The Wayback Machine, Jul. 7, 2021, [online][Nov. 17, 2022] https://asia.canon/en/business/form-joint-utilizing-volumetric-video-technology/news.

(Continued)

*Primary Examiner* — Said Broome
*Assistant Examiner* — Andrew Shin
(74) *Attorney, Agent, or Firm* — KONRAD, RAYNES, DAVDA & VICTOR LLP; Rabindranath Dutta (57) ABSTRACT

A computational device of a virtual reality system receives a volumetric video in an uncompressed form. A first portion of the volumetric video that is less than an entirety of the volumetric video is compressed, wherein a second portion of the volumetric video that is less than the entirety of the volumetric video is maintained in the uncompressed form.

21 Claims, 9 Drawing Sheets

(56) References Cited

OTHER PUBLICATIONS

J. Antunes, "Canon and IBM: using volumetric video to promote visual art", ProVideo Coalition, Jul. 13, 2021, 7 pp.
"Canon, Inc. and IBM Launch Collaboration in Entertainment and the Arts in Japan", IBM, Jul. 15, 2021, 3 pp.
A. Cohen, "Welcome to the Netaverse, Where Brooklyn Nets Players Can Be Seen in a Whole New (3D) Light", SportTechie Feb. 3, 2022, 5 pp.
"The Business Benefits of Volumetric Video", B T Business, Jun. 17, 2021, 10 pp., [online][Nov. 17, 2022] https://business.bt.com/why-choose-bt/insights/the-future-is-now/transforming-industries-with-volumetric-video/.

* cited by examiner

SELECTIVE COMPRESSION OF VOLUMETRIC VIDEO IN A VIRTUAL REALITY ENVIRONMENT PRELIMINARY CLASS

BACKGROUND

1. Field

Embodiments relate to a method, system, and computer program product for the selective compression of volumetric video in a virtual reality environment.

2. Background

Virtual Reality may be described as a computer-generated environment with scenes and objects that appear to be real, making users feel as if they are immersed in their surroundings. The computer-generated environment is perceived through a device known as a virtual reality device that may include a virtual reality headset, a virtual reality helmet, a virtual reality handheld device, etc.

A virtual reality device may perform many types of activities. A virtual reality device may be used for playing games, for multi-user collaboration, for remote activities, for software development, etc. The user does not have to move to a physical site for performing the activities in a virtual reality environment. By using the virtual reality device, a user may be able to secure the entire working environment in the current physical surrounding of the user. As a result, a user may perform various activities from a remote location, and the user may secure the exact working environment in the virtual reality device.

Volumetric video records video in three dimensions, capturing an object or space three-dimensionally. The volumetrically captured object and environment may be transferred to virtual reality environments to be viewed in three dimensions.

In certain situations, the storage requirements for volumetric video received by a user in a virtual reality environment may exceed the storage capacity that a user or a system may prefer to allocate for storing the volumetric video. Additionally, the processing requirements for the volumetric video received by the user in a virtual reality environment may exceed the processing capacity that the user or the system may prefer to allocate for processing the volumetric video. There is a need in the art to provide improved techniques for reducing the storage capacity requirements and for reducing the processing capacity requirements for volumetric video received by a user in a virtual reality environment.

SUMMARY OF THE PREFERRED EMBODIMENTS

Provided are a method, system, and computer program product in which a computational device of a virtual reality system receives a volumetric video in an uncompressed form. A first portion of the volumetric video that is less than an entirety of the volumetric video is compressed, wherein a second portion of the volumetric video that is less than the entirety of the volumetric video is maintained in the uncompressed form.

The above method, system and computer program produce provides various improvements in a virtual reality environment. By compressing the first portion of the volumetric video while maintaining the second portion of the volumetric video in an uncompressed form, storage requirements and processing requirements for volumetric video are reduced in comparison to mechanisms in which the entirety of the volumetric video is maintained in an uncompressed form.

In further embodiments, a plurality of three-dimensional boundaries are defined inside the volumetric video. Portions of the volumetric video encompassed by different three-dimensional boundaries are compressed in a different manner. As a result, different portions of the volumetric video that are of different interest to a user may be compressed differently. For example, a portion of a volumetric video that is of greater interest to a user for navigation may be compressed less than another portion of the volumetric video that is of lesser interest to the user for navigation.

In yet further embodiments, the first portion and the second portion of the volumetric video are navigated. As a result, the user is able to navigate in a virtual reality environment in both compressed and uncompressed portions of volumetric video.

In additional embodiments, different regions of the volumetric video are compressed differently by different compression rules. As a result, the different regions of a volumetric video may be compressed more effectively. For example, portions of a volumetric video with a lot of vivid colors may be compressed with a different compression rule than other portions of the volumetric video.

In yet additional embodiments, the different compression rules are based on different viewing directions. As a result, features and objects in volumetric video that may be different in different directions may be compressed more effectively.

In certain embodiments, a plurality of contexts are defined within the volumetric video. As a result, a user may denote regions of interest in the volumetric video that may undergo different types of compression.

In further embodiments, different portions of the volumetric video are classified based on storage cost, wherein an amount of space that is saved based on different levels of compression of different objects and contexts inside the volumetric video are displayed. As a result, a system may be able to determine the level of compression to use for different objects and contexts.

In additional embodiments, in addition to defining compression rule on different portions inside the volumetric video, regeneration rules for images are generated, wherein while playing the volumetric video, the regeneration rules are used to recreate an original version of the volumetric video. As a result, a user may be able to secure the original version of the volumetric video from compressed video when such a need arises for the user.

In further embodiments, based on context of the volumetric video, specified space limit defined by a user, and historical learning data about compression of the volumetric video, operations are performed to highlight different boundaries in the volumetric video and a level of the compression in different three-dimensional spaces in the volumetric video. As a result, machine learning based segmentation of a volumetric video into different regions may be performed for reducing space and processing requirements for volumetric video received by a user in a virtual reality environment.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Volumetric video technology may use cameras and advanced data processing to render three-dimensional (3D) images from a virtual space, which allows for video point of views to be generated from any angle within that space to create a more immersive experience for viewers. Using volumetric video, a user may view the media from various directions, while using a virtual reality system or a 3D display system or any two-dimensional (2D) display system.

Volumetric video may allow the use of new mechanisms for collaboration and enable virtual offices to be created. Volumetric video involves processing feeds from multiple cameras from various directions to create a volume of video. For creating volumetric video, computing devices process and combine multiple image feeds that have been captured from different directions.

Volumetric video may be watched with virtual reality devices, and based on navigation in the virtual reality environment, the user may access the elements in the volumetric video.

Aspects of the present disclosure provide various improvements to the processing of volumetric video in a virtual reality environment. In certain embodiments where a first portion of a volumetric video is of greater interest to a user in comparison to a second portion of the volumetric video, by compressing the first portion of the volumetric video while maintaining the second portion of the volumetric video in an uncompressed form, storage requirements and processing requirements for volumetric video are reduced in comparison to mechanisms in which the entirety of the volumetric video is maintained in an uncompressed form. For example, in certain embodiments, a first portion of the volumetric video may include a building that is of greater interest to the user in comparison to a second portion of the volumetric video that may comprise a background. In such embodiments, the user or a program may demarcate the three-dimensional boundaries of the building such that the building is retained in an uncompressed form in the volumetric video and greater details are available to the user for navigating within the building in a virtual reality environment.

In certain embodiments, different portions of the volumetric video that are of different interest to a user may be compressed differently. For example, a portion of a volumetric video that is of greater interest to a user for navigation may be compressed less than another portion of the volumetric video that is of lesser interest to the user for navigation. Certain embodiments enable the user to navigate both compressed and uncompressed portions of volumetric video in a virtual reality environment.

In certain embodiments, different regions of the volumetric video are compressed differently by different compression rules. As a result, different regions of a volumetric video may be compressed more effectively based on the objects and features present in the different regions. Viewing directions, contexts, and regions of interest are taken into account into account in certain embodiments to improve compression mechanisms for volumetric video.

In certain embodiments, improvements are made by classifying different portions of the volumetric video based on storage cost, where an amount of space that is saved based on different levels of compression of different objects and contexts inside the volumetric video are displayed. As a result, a system may be able to determine the level of compression to use for different objects and contexts.

Regeneration rules provided in certain embodiments may allow a user to secure the original version of the volumetric video from compressed video when such a need arises for the user. In certain embodiments, machine learning based segmentation of a volumetric video into different regions may be performed for reducing space and processing requirements for volumetric video received by a user in a virtual reality environment.

In certain embodiments, after volumetric video is captured, the user may want to perform selective compression of different objects, based on context in the volumetric video. In certain embodiments, the user may define different boundaries in a selective manner in the volumetric video and may also define compression rules on different objects in the volumetric video. Objects that are of lesser interest for navigation to a user may be compressed more than objects that are of greater interest for navigation to the user.

Certain embodiments provide mechanisms for compressing selected portions of volumetric video and then navigate within the volumetric video. As a result of the reduction in storage and processing requirements caused by the compression of portions of the volumetric video that are of lesser interest to the user during navigation in a virtual reality environment, improvements are made to the operations of computing devices, such as virtual reality devices and other computing devices, in a computing environment. The improvements to the computing devices include lesser storage and processing requirements while at the same time allowing a user to effectively navigate through regions of interest in a virtual reality environment.

Exemplary Embodiments

Figure 1:
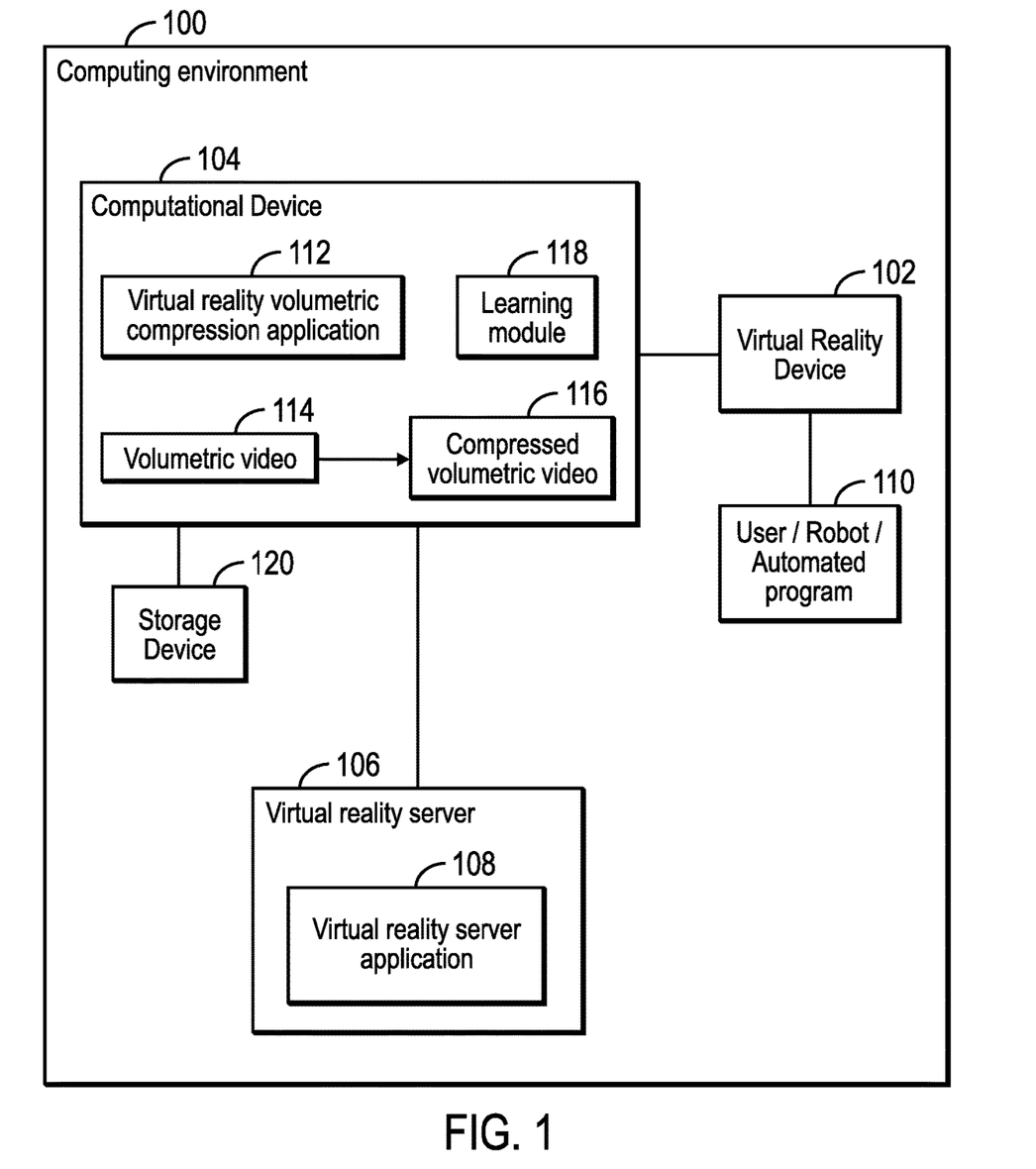
FIG. 1 illustrates a block diagram of a computing environment for a virtual reality device, in accordance with certain embodiments.

FIG. 1 illustrates a block diagram of a computing environment 100 for a virtual reality device 102, in accordance with certain embodiments. The virtual reality device 102 may be communicatively coupled to a computational device 104. In certain alternative embodiments, the virtual reality device 102 may include the computational device 104 or may be included within the computational device 104.

The virtual reality device 102 may be communicatively coupled to a virtual reality server 106 via the computational device 104. A virtual reality server application 108 may execute in the virtual reality server 106. An entity 110, such as a virtual reality user, a robot, or a program may interact with the virtual reality device 102.

In certain embodiments, the virtual reality device 102, the computational device 104, and the virtual reality server 106 may comprise any suitable computational device including those presently known in the art, such as, a personal computer, a workstation, a server, a mainframe, a hand held computer, a palm top computer, a head mounted computer, a telephony device, a network appliance, a blade computer, a processing device, a controller, etc.

The virtual reality device 102, the computational device 104, and the virtual reality server 106 may be elements in any suitable network, such as, a storage area network, a wide area network, the Internet, an intranet, etc. In certain embodiments, the virtual reality device 102, the computational device 104, and the virtual reality server 106 may be elements in a cloud computing environment.

The computational device 104 includes a virtual reality volumetric compression application 112 that may compress a volumetric video 114 to generate a compressed volumetric video 116. A learning module 118 may be used to support the operations of the virtual reality volumetric compression application 112. In certain embodiments, the virtual reality volumetric compression application 112 and the learning module 118 may be implemented in software, hardware, firmware, or any combination thereof.

A storage device 120 that stores data for the computational device 104 may be communicatively coupled to the computational device 104. The volumetric video 114 and the compressed volumetric video 116 may be stored in the storage device 120.

Therefore, FIG. 1 illustrates a computing environment 100 in which a virtual reality volumetric compression application 112 transforms a volumetric video 114 to a compressed volumetric video 116 in a virtual reality computing environment.

Figure 2:
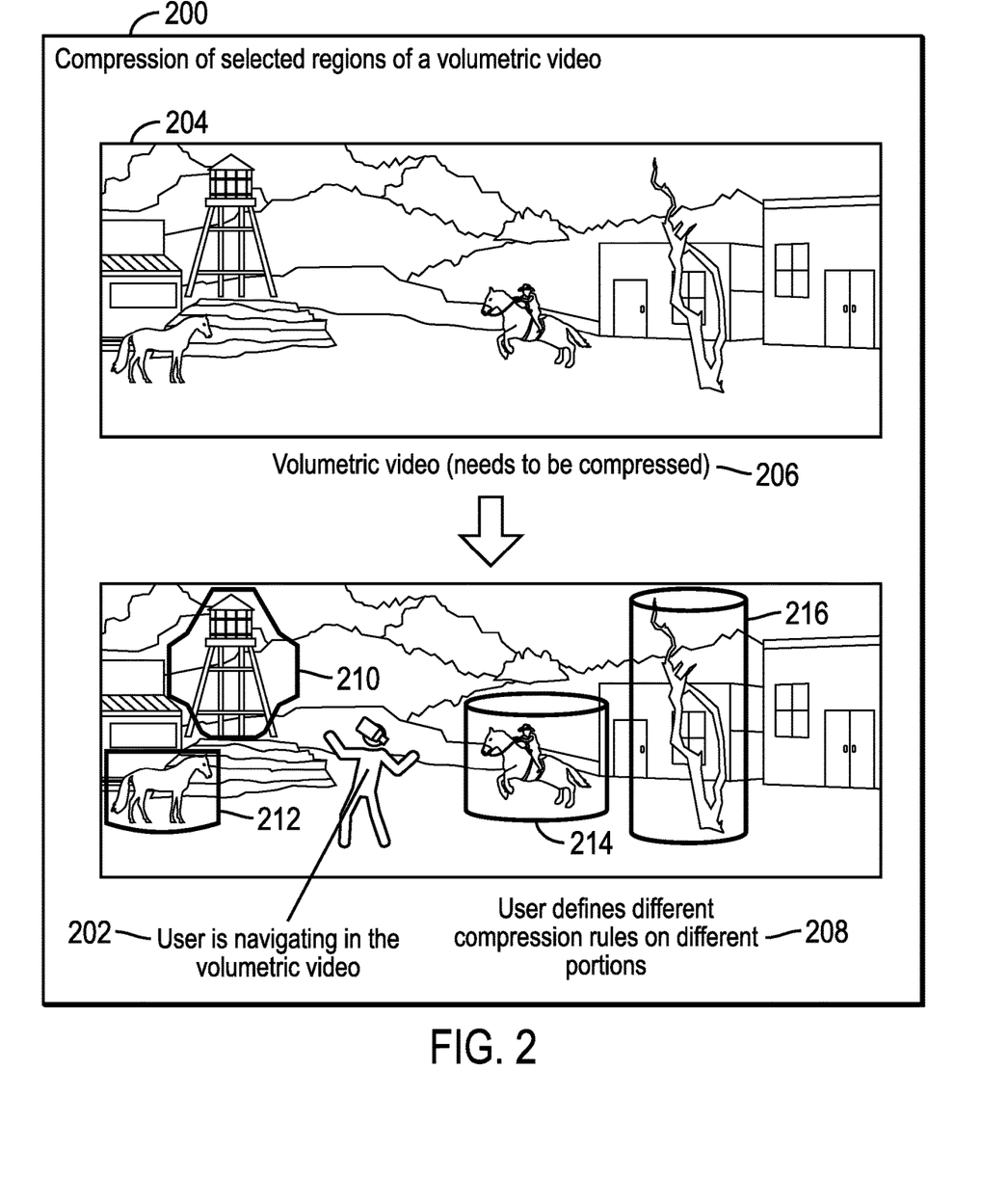
FIG. 2 illustrates a block diagram that shows the compression of selected regions of a volumetric video, in accordance with certain embodiments.

FIG. 2 illustrates a block diagram 200 that shows the compression of selected regions of a volumetric video, in accordance with certain embodiments.

In FIG. 2, a user 202 is shown navigating inside the volumetric video 204 that needs to be compressed (shown via reference numeral 206). The user 202 defines different compression rules on different portions of the volumetric video (shown via reference numerals 208), where the different portions are shown via reference numerals 210, 212, 214, 216.

In certain embodiments, based on the compression rules, the virtual reality volumetric compression application 112 compresses the volumetric video 204 for the portions 210, 212, 214, 216, so that storage requirements for the volumetric video 204 are reduced. It may be noted that different regions may have different levels of compression in the volumetric video. For example, region 214 with the horse and the rider may be compressed more than region 216 that includes the branches of a tree.

While navigating volumetric video, the user may define one or more contexts inside the volumetric video 204. Based on a defined context, certain embodiments identify 3D space having the context and define the compression rule. For example, an exemplary context may be a region that includes a horse and a rider, and the identified 3D space corresponds to block 214.

In certain embodiments shown in FIG. 2, the volumetric video 114 may be navigated with the virtual reality device 102. While navigating the volumetric video with the virtual reality device 102, the user may move around the volumetric video. In the volumetric video, the user may change a directional movement on the volumetric video, select objects on the volumetric video, and perform other operations.

During volumetric video compression, the user may move around the volumetric video and draw different closed loop contours, and 3D boundaries around different objects. A single object or multiple objects may be present inside a closed loop contour. The user may define various such closed loop contours within the volumetric video, and may apply different compression rules to different portions bounded by the closed loop contours.

In certain embodiments, the user may define different level of compression on different selected 3D contours inside the volumetric video. Users may also define different contexts inside the volumetric video (e.g., a "fighting context", etc.), without indicating a user defined boundary.

In certain embodiments, by using volumetric video content analysis, the virtual reality volumetric compression application 112 may identify the contour for a defined context. Certain embodiments may define different contexts in different portions of the volumetric video and may identify the contexts.

Figure 3:
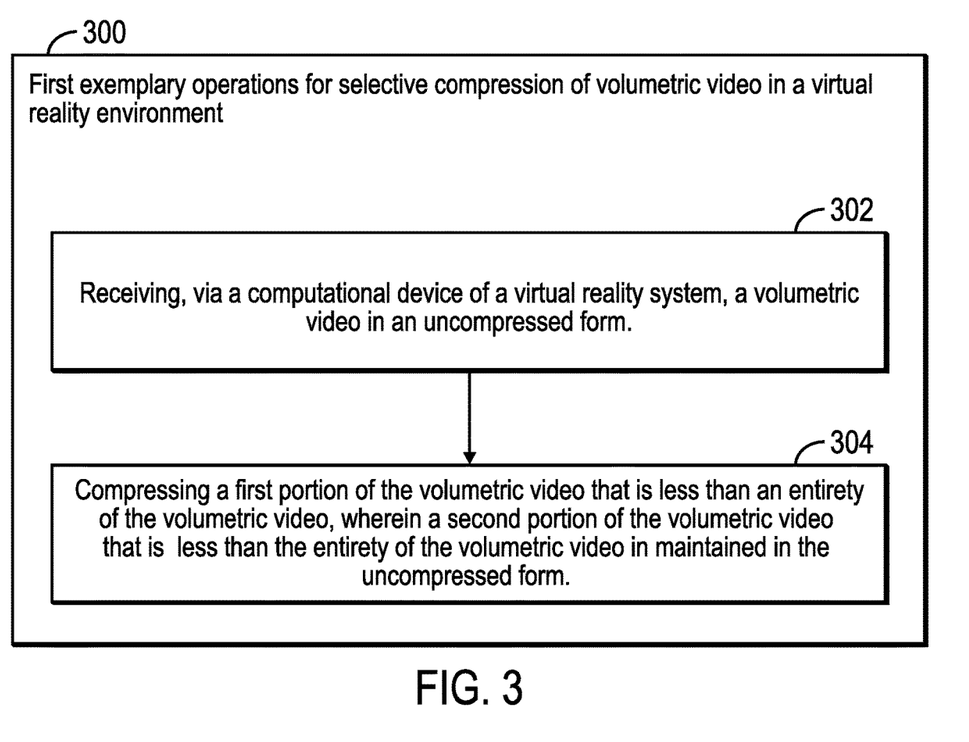
FIG. 3 illustrates first exemplary operations for selective compression of volumetric video in a virtual reality environment, in accordance with certain embodiments.

FIG. 3 illustrates first exemplary operations 300 for selective compression of volumetric video in a virtual reality environment, in accordance with certain embodiments. The operations shown in FIG. 3 may be performed by the virtual reality volumetric compression application 112.

Control starts at block 302 in which a computational device 104 of a virtual reality system receives a volumetric video 114 in an uncompressed form. A first portion of the volumetric video that is less than an entirety of the volumetric video 114 is compressed (at block 304), wherein a second portion of the volumetric video that is less than the entirety of the volumetric video 114 is maintained in the uncompressed form. For example, in FIG. 2, regions other that regions 210, 212, 214, 216 are left uncompressed in the volumetric video 204, whereas regions 210, 212, 214, 216 are compressed.

Figure 4:
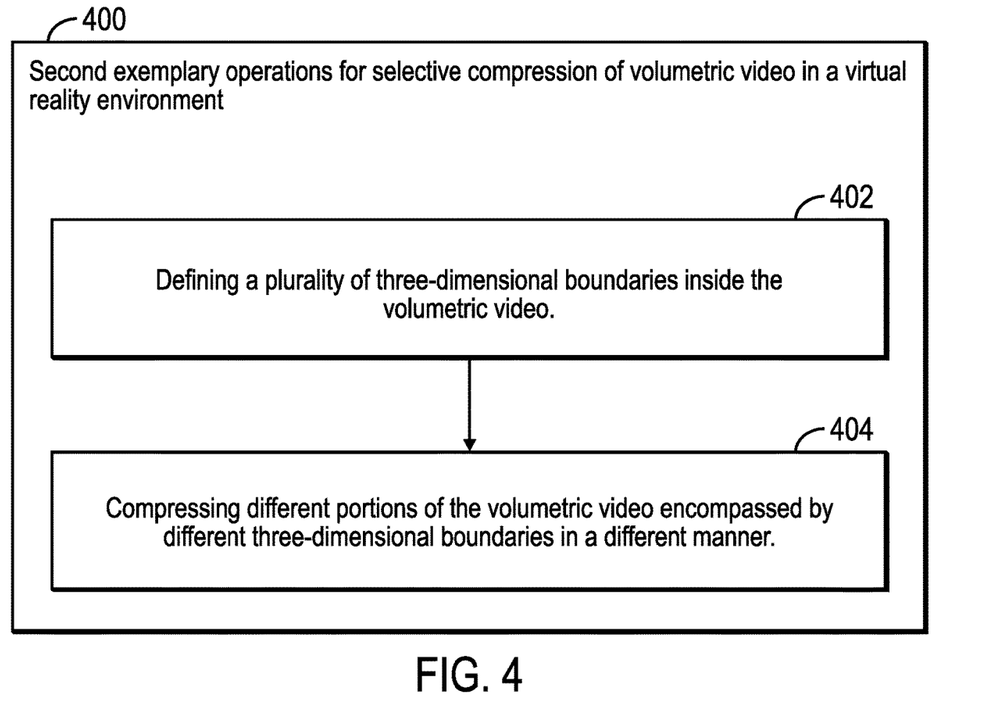
FIG. 4 illustrates second exemplary operations for selective compression of volumetric video in a virtual reality environment, in accordance with certain embodiments.

FIG. 4 illustrates second exemplary operations 400 for selective compression of volumetric video in a virtual reality environment, in accordance with certain embodiments. The operations shown in FIG. 4 may be performed by the virtual reality volumetric compression application 112.

Control starts at block 402 in which a plurality of three-dimensional boundaries are defined inside the volumetric video. From block 402 control proceeds to block 404, in which different portions of the volumetric video encompassed by different three-dimensional boundaries are compressed in a different manner.

Figure 5:
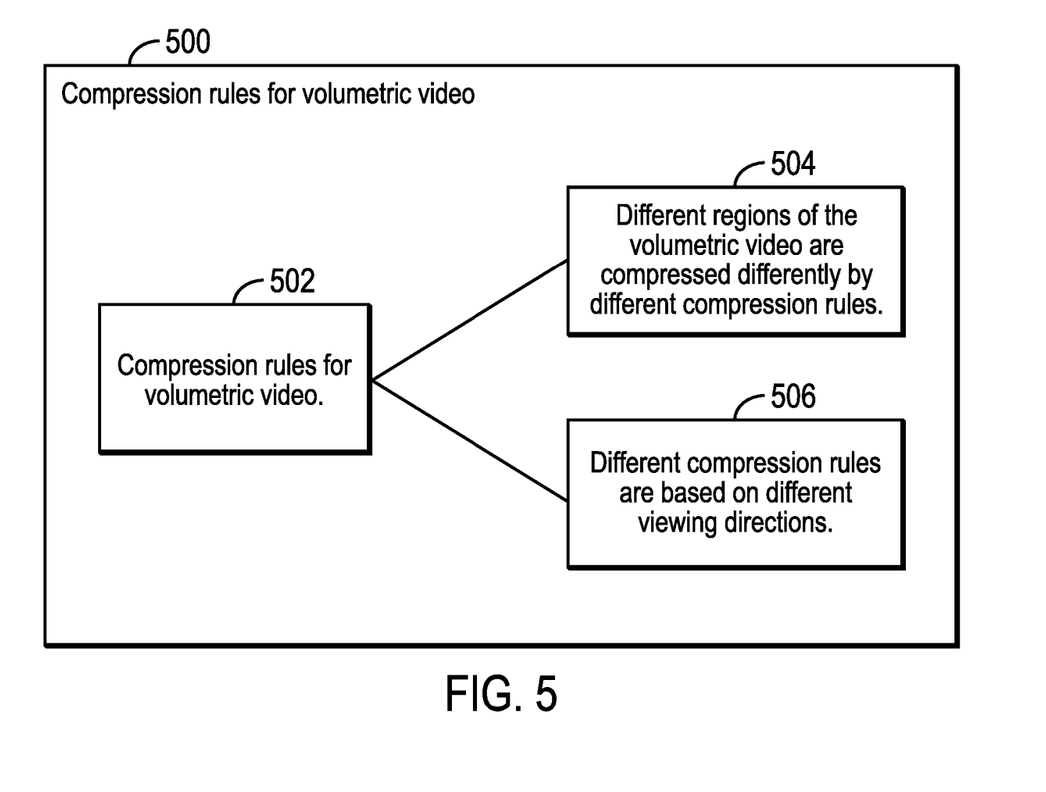
FIG. 5 illustrates a block diagram that shows compression rules for volumetric video, in accordance with certain embodiments.

FIG. 5 illustrates a block diagram 500 that shows compression rules for volumetric video, in accordance with certain embodiments. The operations associated with the compression rules shown in FIG. 5 may be performed by the virtual reality volumetric compression application 112.

The compression rules for volumetric video are shown via reference numeral 502. In certain embodiments, different regions of the volumetric video are compressed differently by different compression rules (as shown via reference numeral 504), where the different regions may comprise different three-dimensional portions of the volumetric video. In other embodiments, the different compression rules are based on different viewing directions of the user (as shown via reference numeral 506).

Certain embodiments allow the user to define compression rules on different contours defined in the volumetric video. The user may define the compression percentage, or may also define any compression algorithm that is to be applied on different contours.

Figure 6:
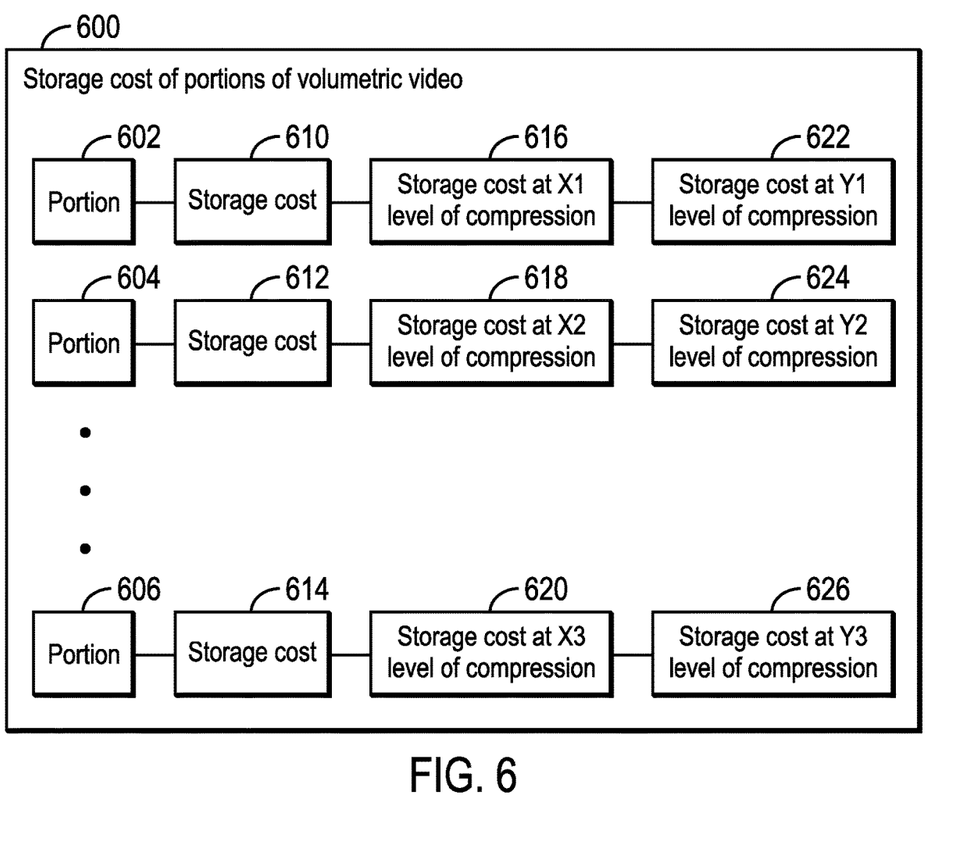
FIG. 6 illustrates a block diagram that shows storage cost of portions of volumetric video, in accordance with certain embodiments.

FIG. 6 illustrates a block diagram 600 that shows storage cost of portions of volumetric video, in accordance with certain embodiments. The operations associated with the storage cost computations shown in FIG. 6 may be performed by the virtual reality volumetric compression application 112.

A plurality of portions of a volumetric video are shown via reference numerals 602, 604, 606. The storage cost of the uncompressed video of each of the portions 602, 604, 606 are shown via the reference numerals 610, 612, 614 respectively. The storage cost may include the amount of storage space needed for storage.

The storage cost of the each of the portions 602, 604, 606 at different levels of compression are shown via the reference numerals 616, 618, 620, 622, 624, 626, where a level of compression indicates the extent of compression.

Certain embodiments analyze the volumetric video, based on available objects, contexts, etc., and accordingly different portion of the volumetric video are classified based on storage cost. In certain embodiments, a virtual reality interface is used to show how much space may be saved based on different level of compression of different objects and contexts inside the volumetric video.

Certain embodiments analyze the volumetric video and may identify the size of each object inside the volumetric video, and determine how much space is required for different objects. Based on defined 3D contours and the objects present inside the 3D contours, certain systems may estimate the space required to store the portions of the volumetric video bounded by different 3D contours. The user may define compression rules on portions of volumetric video bounded by each contour, and accordingly identify space required after compression. The user may define different 3D contours on the volumetric video, and accordingly can visualize how much space is required after compression. The user may additionally apply different compression rules for different viewing directions, and the compression rules may be defined while the user is navigating on the volumetric video.

Figure 7:
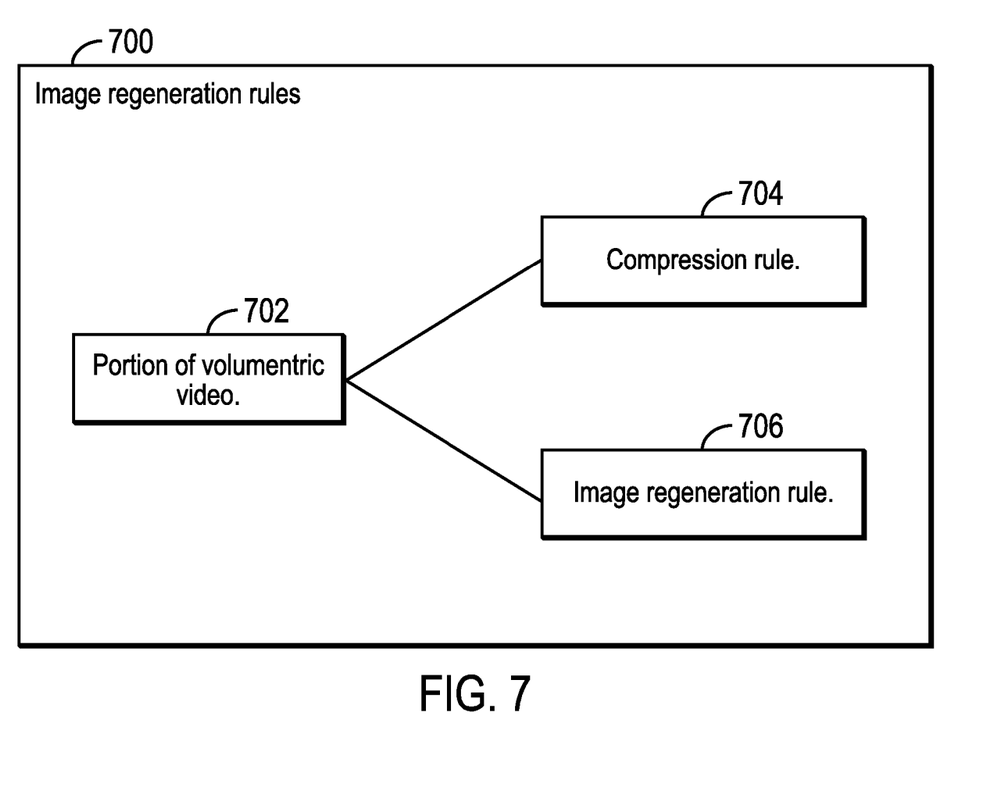
FIG. 7 illustrates a block diagram that shows image regeneration rules, in accordance with certain embodiments.

FIG. 7 illustrates a block diagram 700 that shows image regeneration rules, in accordance with certain embodiments. The operations associated with the image regeneration rules shown in FIG. 7 may be performed by the virtual reality volumetric compression application 112.

A portion of a volumetric video is shown via reference numeral 702. A compression rule 704 for the portion 702 and an image regeneration rule 706 from compressed video are also shown.

Therefore, in certain embodiments, in addition to defining compression rule on different portions inside the volumetric video, regeneration rules for images are generated, wherein while playing the volumetric video, the regeneration rules are used to recreate an original version of the volumetric video.

Figure 8:
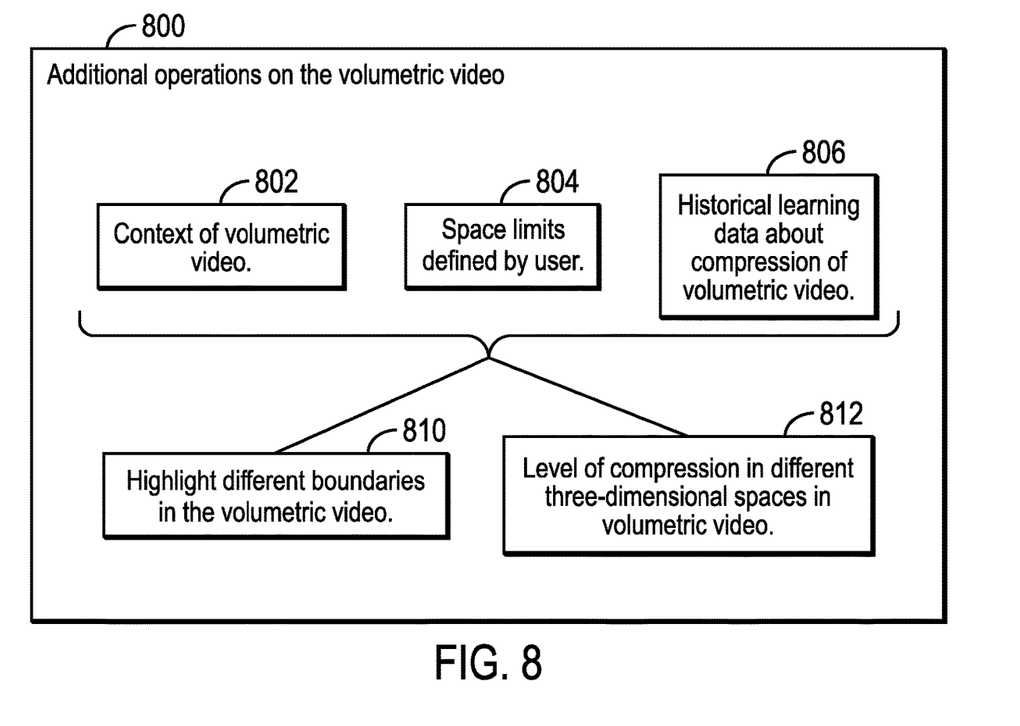
FIG. 8 illustrates a block diagram that shows additional operations on the volumetric video, in accordance with certain embodiments.

FIG. 8 illustrates a block diagram 800 that shows additional operations on the volumetric video, in accordance with certain embodiments. The operations associated with the additional operations shown in FIG. 8 may be performed by the virtual reality volumetric compression application 112.

FIG. 8 shows embodiments in which based on context of the volumetric video (reference numeral 802), and specified space limits defined by a user (reference numeral 804) and historical learning data about compression of the volumetric video (reference numeral 806), operations are performed to highlight different boundaries in the volumetric video (reference numeral 810) and to indicate a level of the compression in different three-dimensional spaces in the volumetric video (reference numeral 812).

Certain embodiments are used to analyze the context of the volumetric video and the historical learning data about volumetric video compression. The user may also define the final size of the volumetric video after compression. Based on historical learning, certain embodiments may identify how the volumetric video may be compressed and may display the amount of compression in the virtual reality environment.

Using the virtual reality device, the user may update a volumetric video with a compression rule and may also map different predefined compression rules to different portions of the volumetric video. A video compression system may be used to analyze the user defined rules on the volumetric video, and the volumetric video may be compressed in accordance with the user defined rules.

Therefore, FIGS. 1-8 illustrate certain embodiments for compressing selected portions of volumetric video and then navigate within the volumetric video in a virtual reality environment.

Using a virtual reality device, a user may navigate a volumetric video and may define different 3D boundaries inside the volumetric video, The user may also add appropriate video compression rules for different 3D boundaries inside the volumetric video, and the volumetric video may be compressed accordingly.

A user may map different user defined 3D spaces inside the volumetric video, and map a predefined compression rule or reuse a customized compression rule, and accordingly the volumetric video is compressed when stored in a cloud server. Users may define volumetric video compression based on different viewing directions, where different viewing direction may have different compression rules.

While navigating volumetric video, the user may define one or more contexts inside the volumetric video. Based on the defined context, certain embodiments may identify 3D space having the context and apply a corresponding compression rule.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 9:
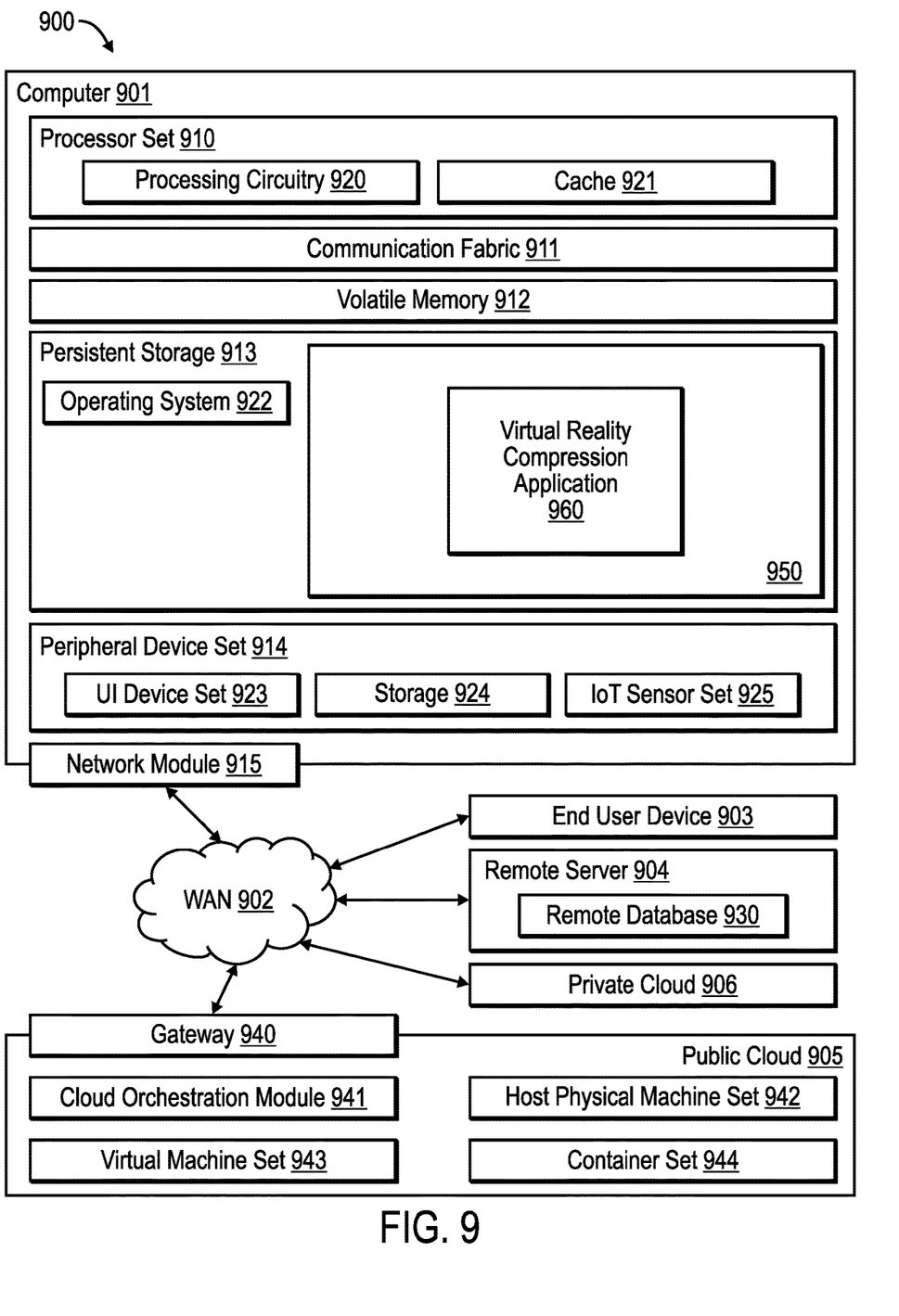
FIG. 9 illustrates a computing environment in which certain components of FIG. 1 may be implemented, in accordance with certain embodiments.

In FIG. 9, computing environment 900 contains an example of an environment for the execution of at least some of the computer code (block 950) involved in performing the operations of the virtual reality compression application 960.

In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 10. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 950 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 950 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Several examples will now be provided to further clarify various aspects of the present disclosure:

Example 1: A method comprising receiving, via a computational device of a virtual reality system, a volumetric video in an uncompressed form, and compressing a first portion of the volumetric video that is less than an entirety of the volumetric video, wherein a second portion of the volumetric video that is less than the entirety of the volumetric video in maintained in the uncompressed form.

Example 2: The limitations of Example 1, further comprising defining a plurality of three-dimensional boundaries inside the volumetric video, and compressing different portions of the volumetric video encompassed by different three-dimensional boundaries in a different manner.

Example 3: The limitations of any of Examples 1-2, further comprising navigating the first portion and the second portion of the volumetric video.

Example 4: The limitations of any of Examples 1-3, wherein different regions of the volumetric video are compressed differently by different compression rules.

Example 5: The limitations of any of Examples 1-4, wherein the different compression rules are based on different viewing directions.

Example 6: The limitations of any of Examples 1-5, wherein a plurality of contexts are defined within the volumetric video.

Example 7: The limitations of any of Examples 1-6, wherein different portions of the volumetric video are classified based on storage cost and wherein an amount of space that is saved based on different levels of compression of different objects and contexts inside the volumetric video are displayed.

Example 8: The limitations of any of Examples 1-7, wherein in addition to defining compression rule on different portions inside the volumetric video, regeneration rules for images are generated, wherein while playing the volumetric video, the regeneration rules are used to recreate an original version of the volumetric video.

Example 9: The limitations of any of Examples 1-8, wherein based on the context of the volumetric video, specified space limit defined by a user, and historical learning data about compression of the volumetric video, operations are performed to highlight different boundaries in the volumetric video and a level of the compression in different three-dimensional spaces in the volumetric video.

Example 10: A system comprising a memory and a processor coupled to the memory, wherein the processor performs a method according to any of Examples 1-9.

Example 11: A computer program product comprising a computer readable storage medium having computer readable program code embodied therewith, wherein the computer readable program code when executed is configured to perform a method according to any of Examples 1-9.

What is claimed is:

1. A method comprising:
   receiving, via a computational device of a virtual reality system, a volumetric video in an uncompressed form; and
   compressing a first portion of the volumetric video that is less than an entirety of the volumetric video, wherein a second portion of the volumetric video that is less than the entirety of the volumetric video is maintained in the uncompressed form, wherein different portions of the volumetric video are classified based on storage cost and wherein an amount of space that is saved based on different levels of compression of different objects and contexts inside the volumetric video are displayed.

2. The method of claim 1, the method further comprising:
defining a plurality of three-dimensional boundaries inside the volumetric video; and
compressing different portions of the volumetric video encompassed by different three-dimensional boundaries in a different manner.

3. The method of claim 2, the method further comprising:
navigating the first portion and the second portion of the volumetric video.

4. The method of claim 1, wherein a plurality of contexts are defined within the volumetric video.

5. The method of claim 1, wherein in addition to defining compression rule on different portions inside the volumetric video, regeneration rules for images are generated, wherein while playing the volumetric video, the regeneration rules are used to recreate an original version of the volumetric video.

6. A method comprising:
receiving, via a computational device of a virtual reality system, a volumetric video in an uncompressed form; and
compressing a first portion of the volumetric video that is less than an entirety of the volumetric video, wherein a second portion of the volumetric video that is less than the entirety of the volumetric video is maintained in the uncompressed form, and wherein based on context of the volumetric video, specified space limit defined by a user, and historical learning data about compression of the volumetric video, operations are performed to highlight different boundaries in the volumetric video and a level of the compression in different three-dimensional spaces in the volumetric video.

7. The method of claim 6, wherein different regions of the volumetric video are compressed differently by different compression rules.

8. The method of claim 7, wherein the different compression rules are based on different viewing directions.

9. A system, comprising:
a memory; and
a processor coupled to the memory, wherein the processor performs operations, the operations comprising:
receiving, via a virtual reality system, a volumetric video in an uncompressed form; and
compressing a first portion of the volumetric video that is less than an entirety of the volumetric video, wherein a second portion of the volumetric video that is less than the entirety of the volumetric video is maintained in the uncompressed form, wherein different portions of the volumetric video are classified based on storage cost and wherein an amount of space that is saved based on different levels of compression of different objects and contexts inside the volumetric video are displayed.

10. The system of claim 9, the operations further comprising:
defining a plurality of three-dimensional boundaries inside the volumetric video; and
compressing different portions of the volumetric video encompassed by different three-dimensional boundaries in a different manner.

11. The system of claim 10, the operations further comprising:

navigating the first portion and the second portion of the volumetric video.

12. The system of claim 9, wherein a plurality of contexts are defined within the volumetric video.

13. A computer program product, the computer program product comprising a computer readable storage medium having computer readable program code embodied therewith, the computer readable program code when executed is configured to perform operations, the operations comprising:
receiving, via a computational device of a virtual reality system, a volumetric video in an uncompressed form; and
compressing a first portion of the volumetric video that is less than an entirety of the volumetric video, wherein a second portion of the volumetric video that is less than the entirety of the volumetric video is maintained in the uncompressed form, wherein different portions of the volumetric video are classified based on storage cost and wherein an amount of space that is saved based on different levels of compression of different objects and contexts inside the volumetric video are displayed.

14. The computer program product of claim 13, the operations further comprising:
defining a plurality of three-dimensional boundaries inside the volumetric video; and
compressing different portions of the volumetric video encompassed by different three-dimensional boundaries in a different manner.

15. The computer program product of claim 14, the operations further comprising:
navigating the first portion and the second portion of the volumetric video.

16. A system, comprising:
a memory; and
a processor coupled to the memory, wherein the processor performs operations, the operations comprising:
receiving, via a virtual reality system, a volumetric video in an uncompressed form; and
compressing a first portion of the volumetric video that is less than an entirety of the volumetric video, wherein a second portion of the volumetric video that is less than the entirety of the volumetric video is maintained in the uncompressed form, and wherein based on context of the volumetric video, specified space limit defined by a user, and historical learning data about compression of the volumetric video, operations are performed to highlight different boundaries in the volumetric video and a level of the compression in different three-dimensional spaces in the volumetric video.

17. The system of claim 16, wherein different regions of the volumetric video are compressed differently by different compression rules.

18. The system of claim 17, wherein the different compression rules are based on different viewing directions.

19. A computer program product, the computer program product comprising a computer readable storage medium having computer readable program code embodied therewith, the computer readable program code when executed is configured to perform operations, the operations comprising:
receiving, via a computational device of a virtual reality system, a volumetric video in an uncompressed form; and
compressing a first portion of the volumetric video that is less than an entirety of the volumetric video, wherein a second portion of the volumetric video that is less than the entirety of the volumetric video is maintained in the uncompressed form, and wherein based on context of the volumetric video, specified space limit defined by a user, and historical learning data about compression of the volumetric video, operations are performed to highlight different boundaries in the volumetric video and a level of the compression in different three-dimensional spaces in the volumetric video.

20. The computer program product of claim 19, wherein different regions of the volumetric video are compressed differently by different compression rules.

21. The computer program product of claim 20, wherein the different compression rules are based on different viewing directions.

* * * * *